United States Patent
Chen et al.

(10) Patent No.: US 10,021,014 B2
(45) Date of Patent: Jul. 10, 2018

(54) AVOIDING ROUTING INTERRUPTION DURING TRANSITION TO A VIRTUAL ENTITY

(71) Applicant: Futurewei Technologies, Inc., Plano, TX (US)

(72) Inventors: Huaimo Chen, Bolton, MA (US); Renwei Li, Fremont, CA (US); Anil Kumar S N, Bangalore (IN); Veerendranatha Reddy Vallem, Bangalore (IN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 127 days.

(21) Appl. No.: 14/918,172

(22) Filed: Oct. 20, 2015

(65) Prior Publication Data

US 2016/0112265 A1 Apr. 21, 2016

Related U.S. Application Data

(60) Provisional application No. 62/066,408, filed on Oct. 21, 2014.

(51) Int. Cl.
*H04L 12/24* (2006.01)
*H04L 12/751* (2013.01)

(52) U.S. Cl.
CPC .................................. *H04L 45/02* (2013.01)

(58) Field of Classification Search
None
See application file for complete search history.

(56) References Cited

U.S. PATENT DOCUMENTS

| 1,337,259 | A | 4/1920 | Parker |
| 1,364,648 | A | 1/1921 | Shirlow |
| 2002/0085498 | A1* | 7/2002 | Nakamichi ......... H04L 12/2602 370/236 |
| 2012/0243443 | A1* | 9/2012 | Li ........................... H04L 45/02 370/256 |
| 2013/0089005 | A1* | 4/2013 | Li ......................... H04L 45/025 370/255 |

(Continued)

OTHER PUBLICATIONS

Chen et al., "OSPF Topology-Transparent Zone," May 4, 2013, draft-chen-ospf-ttz-05.txt.*

(Continued)

*Primary Examiner* — Charles C Jiang
*Assistant Examiner* — George Atkins, Jr.
(74) *Attorney, Agent, or Firm* — Wen-Jeng Vincent Lue (57) ABSTRACT

A method of avoiding routing interruption during transition to a topology transparent zone (TTZ) including virtualizing a path from an edge router to another edge router within the TTZ in a first direction without removing original links, wherein the original links are links from the edge router to its neighboring routers within the TTZ, receiving, by the edge router within the TTZ, a router link state advertisement (LSA) from the another edge router within the TTZ while the original links remain in place, wherein the LSA comprises a path from the another edge router to the edge router in a second direction different from the first direction, and removing, by the edge router within the TTZ, the original links after the LSA has been received from the another edge router and the virtualization of the path is complete.

10 Claims, 8 Drawing Sheets

(56) References Cited

U.S. PATENT DOCUMENTS

2013/0254195 A1* 9/2013 Chen .................... H04L 47/122 707/736

OTHER PUBLICATIONS

Chen, H., et al., "OSPF Topology-Transparent Zone," draft-chen-ospf-ttz-01.txt, Mar. 12, 2012, 22 pages.
Chen, H., et al., "OSPF Topology-Transparent Zone," draft-chen-ospf-ttz-02.txt, Jul. 16, 2012, 20 pages.
Chen, H., et al., "OSPF Topology-Transparent Zone," draft-chen-ospf-ttz-03.txt, Oct. 10, 2012, 20 pages.
Chen, H., et al., "OSPF Topology-Transparent Zone," draft-chen-ospf-ttz-04.txt, Feb. 25, 2014, 16 pages.
Chen, H., et al., "OSPF Topology-Transparent Zone," draft-chen-ospf-ttz-05.txt, May 4, 2013, 16 pages.
Chen, H., et al., "OSPF Topology-Transparent Zone," draft-chen-ospf-ttz-06.txt, Jul. 15, 2013, 16 pages.
Chen, H., et al., "OSPF Topology-Transparent Zone," draft-chen-ospf-ttz-07.txt, Jan. 16, 2014, 15 pages.
Chen, H., et al., "OSPF Topology-Transparent Zone," draft-chen-ospf-ttz-08.txt, Jul. 4, 2014, 19 pages.
Chen, H., et al., "OSPF Topology-Transparent Zone," draft-chen-ospf-ttz.09.txt, Oct. 26, 2014, 21 pages.
Chen, H., et al., "OSPF Topology-Transparent Zone," draft-ietf-ospf-ttz.00.txt, Jan. 25, 2015, 21 pages.
Chen, H., et al., "OSPF Topology-Transparent Zone," draft-ietf-ospf-ttz-01.txt, Jul. 2, 2015, 22 pages.
Oran, D., Ed., "OSI IS-IS Intra-domain Routing Protocol," RFC 1142, Feb. 1990, 157 pages.
Bradner, S., et al., "Key words for use in RFCs to Indicate Requirement Levels," RFC 2119, Mar. 1997, 3 pages.
Moy, J., "OSPF Version 2," RFC 2328, 244 pages.
Coltun, R., et al., "The OSPF Opaque LSA Option," RFC 2370, Jul. 1998, 15 pages.
Coltun, R., et al., "OSPF for IPv6," RFC 2740, Dec. 1999, 80 pages.
Katz, D., et al., "Traffic Engineering (TE) Extensions to OSPF Version 2," RFC 3630, Sep. 2003, 14 pages.
Lindem, A., Ed., et al., "Extensions to OSPF for Advertising Optional Router Capabilities," RFC 4970, Jul. 2007, 13 pages.
Berger, L., et al., "The OSPF Opaque LSA Option," RFC 5250, Jul. 2008, 17 pages.
Coltun, R., et al., "OSPF for IPv6", RFC 5340, Jul. 2008, 94 pages.
Vasseur, JP., Ed., et al., "Path Computation Element (PCE) Communication Protocol (PCEP)," RFC 5440, Mar. 2009, 87 pages.
Vasseur, JP., Ed., et al., "A Backward-Recursive PCE-Based Computation (BRPC) Procedure to Compute Shortest Constrained Inter-Domain Traffic Engineering Label Switched Paths," RFC 5441, Apr. 2009, 18 pages.
Zinin, A., et al., "OSPF Link-Local Signaling," RFC 5613, Aug. 2009, 12 pages.
Aggarwal, R., et al., "Advertising a Router's Local Addresses in OSPF Traffic Engineering (TE) Extensions," RFC 5786, Mar. 2010, 7 pages.
Chen, H., et al., "OSPF Topology-Transparent Zone," draft-chen-ospf-ttz-00.txt, Oct. 24, 2011, 20 pages.

* cited by examiner

AVOIDING ROUTING INTERRUPTION DURING TRANSITION TO A VIRTUAL ENTITY

CROSS-REFERENCE TO RELATED APPLICATIONS

This patent application claims the benefit of U.S. Provisional Patent Application No. 62/066,408, filed Oct. 21, 2014, by Chen, et al., and entitled "Avoiding Routing Interruption During Transition to a Virtual Entity," which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet Engineering Task Force (IETF) Request for Comments (RFC) document "OSPF Version 2," RFC 2328, which is incorporated herein by reference, describes Open Shortest Path First (OSPF) areas in an Autonomous System (AS). Each area has a number of area border routers connected to the backbone. Each area border router summarizes the topology of its attached non-backbone areas for transmission on the backbone, and hence to all other area border routers. An area border router then has complete topological information concerning the backbone, and the area summaries from each of the other area border routers. From this information, the router calculates paths to all the destinations outside of its attached area. The router then advertises these paths into its attached areas. This enables the area's internal routers to pick the best exit router when forwarding traffic to destinations outside of the area.

The IETF RFC document "OSI IS-IS Intra-domain Routing Protocol," RFC 1142, which is a republication of the International Organization for Standardization (ISO) and the International Electrotechnical Commission (IEC) 10589, which are each incorporated herein by reference, describes Intermediate System to Intermediate System (IS-IS) areas in an AS, which are similar to OSPF areas. As used herein, OSI refers to an Open Systems Interconnection model.

Any link state change within an area may lead to a number of link state distributions to other areas. This will trigger routers in other areas to re-calculate their OSPF or IS-IS routes, and update their Routing Information Base (RIB) and Forwarding Information Base (FIB). All these will consume network resources including network bandwidth and Central Process Unit (CPU) time.

The topology transparent zone (TTZ) was recently proposed to resolve all these issues. However, routing interruptions may be experienced when a group of routers and a number of links connecting these routers are being transferred to a virtual entity such as the TTZ.

SUMMARY

In one embodiment, the disclosure includes a method of avoiding routing interruption during transition to a topology transparent zone (TTZ) including virtualizing a path from an edge router to another edge router within the TTZ in a first direction without removing original links, wherein the original links are links from the edge router to its neighboring routers within the TTZ, receiving, by the edge router within the TTZ, a router link state advertisement (LSA) from the another edge router within the TTZ while the original links remain in place, wherein the LSA comprises a path from the another edge router to the edge router in a second direction different from the first direction, and removing, by the edge router within the TTZ, the original links after the LSA has been received from the another edge router and the virtualization of the path is complete.

In another embodiment, the disclosure includes an edge router within a topology transparent zone (TTZ) including an input/output (I/O) device configured to receive and transmit packets between edge routers, and a processor operably coupled to the I/O device and configured to virtualize a path from an edge router to another edge router within the TTZ in a first direction without removing original links, wherein the original links are links from the edge router and the another edge router to their neighboring routers within the TTZ, receive a router link state advertisement (LSA) from the another edge router within the TTZ while the original links remain in place, wherein the LSA comprises a path from the another edge router to the edge router in a second direction different from the first direction, and remove the original links after the LSA has been received from the another edge router and the virtualization of the path is complete to transition to the TTZ.

In yet another embodiment, the disclosure includes a method of smooth migration to a topology transparent zone (TTZ) for routers having a TTZ feature enabled. The method includes distributing, by a first router, first router TTZ information to a second router neighboring the first router, wherein the first router TTZ information includes a first TTZ control advertisement configured to trigger the second router to distribute neighbor router TTZ information to a third router neighboring the second router, migrating, by the first router, to TTZ functionality and distributing additional first router TTZ information to the second router, wherein the additional first router TTZ information includes a second TTZ control advertisement configured to trigger the second router to migrate to the TTZ functionality and to distribute additional neighbor router TTZ information to the third router, and removing, by the first router, original links between the first router and the second router after migration of the first router to the TTZ functionality.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure provides systems and methods for avoiding routing interruptions while a group of routers and a number of links connecting these routers are being transferred to a virtual entity such as TTZ. The disclosure includes the procedures for generating a series of a link states for avoiding routing interruptions.

Figure 1:
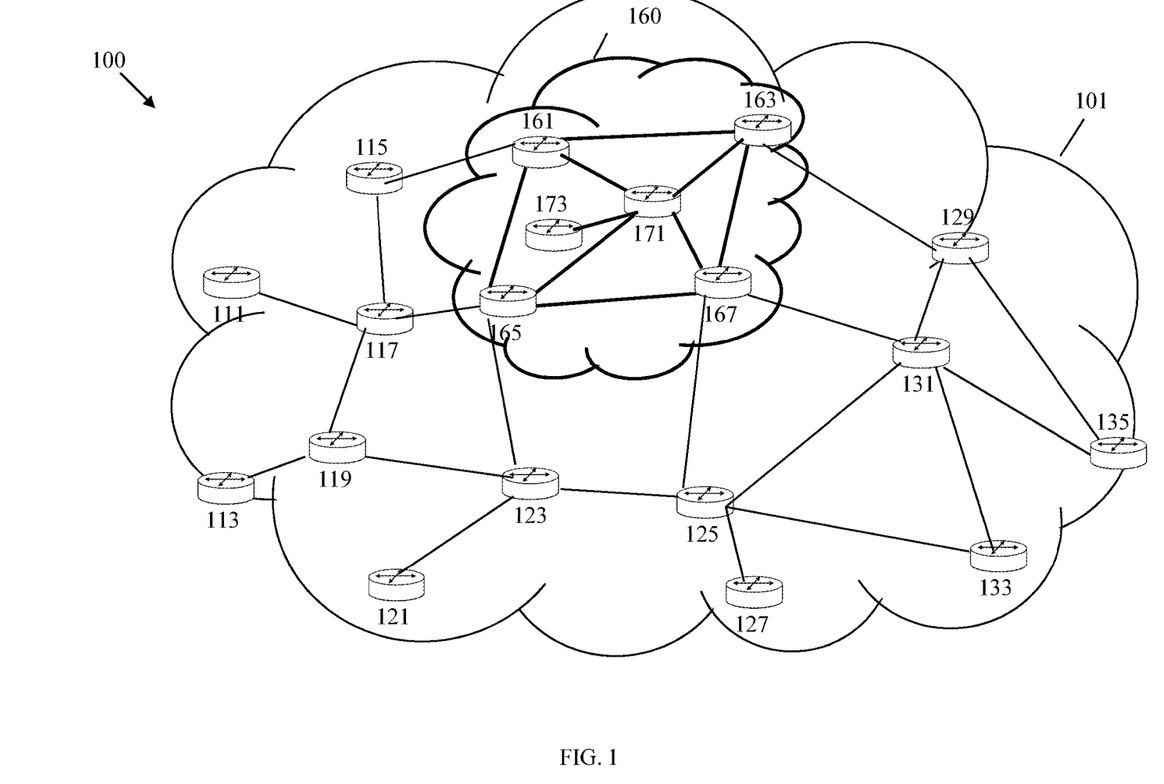
FIG. 1 is a schematic diagram of an embodiment of a topology transparent zone.

FIG. 1 is a schematic diagram of an embodiment of a network system 100 where a plurality of components may be connected. In an embodiment, the network system 100 comprises an Open Shortest Path First (OSPF) area 101, which includes a simple TTZ 160.

The area 101 includes a plurality of area border nodes, including a first area border node 113 and a second area border node 135. The nodes referred to herein may be, for example, routers, switches, bridges, or other network elements. Each area border node may be connected to another OSPF area (not shown). Additionally, the area 101 may comprise a plurality of area internal nodes 111, 115, 117, 119, 121, 123, 125, 127, 129, 131 and 133. The area internal nodes 111-133 are not connected to a node outside of the area 101.

The simple TTZ 160 comprises a plurality of TTZ edge nodes 161, 163, 165, and 167. Each TTZ edge node is connected to at least one node outside of the TTZ 160. For instance, node 161 is a TTZ edge node since it is connected to the area internal node 115, which is outside of TTZ 160. In addition, the TTZ 160 comprises a plurality of TTZ internal nodes 171 and 173. A TTZ internal node is not connected to any node outside of the TTZ 160. For instance, the TTZ internal node 171 is a TTZ internal node since it is not connected to any node outside of the TTZ 160. It is just connected to nodes 161, 163, 165, 167 and 173 inside the TTZ 160.

The TTZ 160 may hide the information inside the TTZ 160 from the outside. In an embodiment, the TTZ 160 may not distribute any internal information about the TTZ to a node outside of the TTZ, which includes the information about a TTZ internal node 171, 173 and a link between any two TTZ nodes. For instance, the TTZ 160 does not send the information about TTZ internal node 171 to any node outside of the TTZ 160 in the area 101. In addition, the TTZ 160 does not send the information about the link between TTZ node 161 and 165 to any node outside of the TTZ 160 in the area 101.

The TTZ 160 may have a TTZ identifier (ID), which may be similar in form to a router ID. In an embodiment, the TTZ ID may be configured on a link between two TTZ nodes, which indicates the link is inside the TTZ or enables the link as a TTZ link. For instance, configuring the TTZ in node 161 on the link between nodes 161 and 165 indicates that this link is inside the TTZ from the point of view of node 161, and configuring the TTZ in node 165 on the link between nodes 165 and 161 indicates that this link is inside the TTZ from the point of view of node 165.

In an embodiment, the TTZ 160 is formed after every link inside the TTZ is configured with the same TTZ ID on both sides of the link. In other words, the TTZ nodes on either side of a link within the TTZ 160 have the same TTZ ID. In an embodiment, the same TTZ ID is configured on the link between nodes 161 and 165, the link between node 165 and 167, the link between node 167 and 163, the link between node 163 and 161, the link between node 171 and 161, the link between node 171 and 163, the link between node 171 and 165, the link between node 171 and 167 and the link between node 171 and 173. Thus, six nodes 161, 163, 165, 167, 171 and 173, and nine links among these six nodes form the TTZ 160 in this example.

From a node outside of the TTZ, the TTZ 160 may be seen as a group of TTZ edge nodes that are connected. In an embodiment, the group of TTZ edge nodes may be fully connected. For instance, node 115, which is outside of the TTZ 160 and connected to the TTZ 160 through TTZ edge node 161, sees the TTZ 160 as a group of TTZ edge nodes, namely nodes 161, 163, 165 and 167. These four TTZ edge nodes are fully connected. The cost from one edge node to another edge node is the cost of the shortest path between these two nodes.

In an embodiment, the group of TTZ edge nodes may be connected to a pseudo node. For instance, node 115, which is outside of the TTZ 160 and connected to the TTZ 160 through TTZ edge node 161, sees the TTZ 160 as a group of TTZ edge nodes, namely nodes 161, 163, 165 and 167. These four TTZ edge nodes are connected to a pseudo node, which may have a TTZ ID as its router ID or the biggest router ID among router IDs of the TTZ edge nodes as its router ID.

In addition, a node outside of the TTZ 160 sees TTZ edge nodes 161-167 having normal connections to the nodes outside of the TTZ. For example, node 115 sees four TTZ edge nodes 161, 163, 165 and 167. Nodes 161 and 163 have the normal connections to nodes 115 and 129, respectively. Node 165 has the normal connections to nodes 117 and 123. Node 167 has the normal connections to nodes 125 and 131.

In an embodiment, a TTZ is defined by all the routers with the same TTZ ID value and all the TTZ links. For a TTZ edge router, its links connected to other TTZ routers belong to the TTZ, which are TTZ links. For a TTZ internal router, all of its links belong to the TTZ, which are TTZ links.

In an embodiment, a TTZ edge router (e.g., edge router 161) generates a router LSA to virtualize the TTZ 160 as a group of edge routers that are connected. In an embodiment, the LSA comprises three groups of links. The first group of links is the set of router links connecting the routers (e.g., router 115, etc.) outside of the TTZ 160 from the TTZ edge router 161. The router links are normal router links. There is generally a router link for every adjacency between the TTZ edge router and a router outside of the TTZ.

The second group of links is the set of "virtual" router links. There is a "virtual" router link from each TTZ edge router (e.g., TTZ edge router 161) to each other TTZ edge router (e.g., TTZ edge routers 163, 165, 167). The cost of the router link from the TTZ edge router (e.g., edge router 161) to one of the other TTZ edge routers (e.g., edge router 163) may be the cost of the shortest path from the TTZ edge router (e.g., edge router 161) to the other edge router (e.g., edge router 163) within the TTZ. The third group of links is the set of the stub links for other destinations inside the TTZ 160. A router LSA generated by a TTZ edge router for virtualizing the TTZ is distributed to the routers outside of the TTZ.

Figure 2:
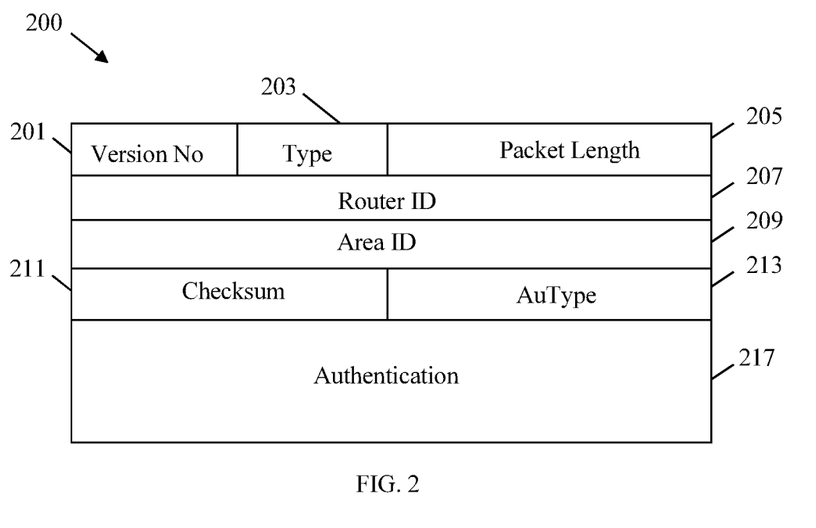
FIG. 2 is an illustration of an embodiment of an Interior Gateway Protocol (IGP) packet header.

FIG. 2 is an illustration of one embodiment of an Interior Gateway Protocol (IGP) packet header 200, which is an OSPF packet header. IGP packet header 200 is followed by the content of an OSPF packet, which will all be put in an Internet Protocol (IP) packet. In an embodiment, the packet header 200 may be used to facilitate packet routing between routers within the TTZ 160 in FIG. 1 (e.g., the edge routers 161-167) and the routers outside the TTZ 160 (e.g., routers 115, 117, 123, 125, 131, and 129) yet within the OSPF area 101. The packet header 200 comprises a Version Number (Version No) field 201, a Type field 203, a Packet Length field 205, a Router ID field 207, an Area ID field 209, a Checksum field 211, an Authentication Type (AuType) field 213, and an Authentication field 217. The value of Version Number field 201 is the OSPF protocol version number. In an embodiment, the value of Version Number field 201 may be set to be 2, which is version 2 of the OSPF protocol. The value of Type field 203 is the kind of OSPF packet. For example, the kind of OSPF packet may be 1, 2, 3, 4, or 5, which represents a Hello packet, a Database Description packet, a Link State Request packet, a Link State Update packet, and a Link State Acknowledgement packet, respectively. The value of Packet Length field 205 is the length of the OSPF protocol packet in bytes, which includes a standard OSPF header. The value of Router ID field 207 is the router ID of the packet's source router. The value of Area ID field 209 is a 32-bit number identifying the area that this packet belongs to. The value of the Checksum field 211 is the standard IP checksum of the entire contents of the packet, which starts with the OSPF packet header but excludes the 64-bit Authentication field 217. The value of AuType field 213 identifies the authentication procedure to be used for the packet. The authentication procedure may be 0, 1 or 2, representing Null authentication, Simple password, or Cryptographic authentication, respectively. The Authentication field 217 is a 64-bit field for use by the authentication scheme.

In one embodiment, when a TTZ edge node of a TTZ sends an IGP packet to a node outside of the TTZ, the value of Router ID field 207 in the IGP packet header 200 of the IGP packet is set to the router ID of the TTZ edge node. For instance, suppose that the router ID of each of TTZ nodes 161, 163, 165, 167, 171 and 173 is 10.1.1.161, 10.1.1.163, 10.1.1.165, 10.1.1.167, 10.1.1.171 and 10.1.1.173, respectively. The TTZ edge node 161 of the TTZ 160 in FIG. 1 will set the value of Router ID field 207 to the router ID 10.1.1.161 of the TTZ edge node 161 when the TTZ edge node 161 constructs and sends an IGP packet to node 115, which is outside of the TTZ 160.

Figure 3:
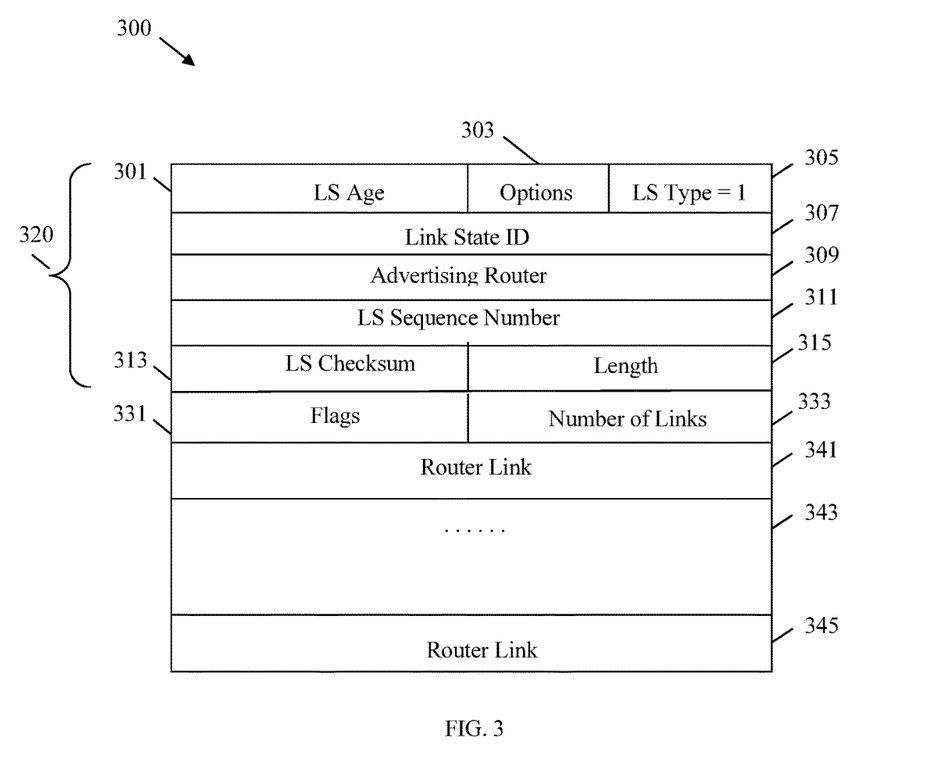
FIG. 3 is an illustration of an embodiment of a router Link State Advertisement (LSA).

FIG. 3 is an illustration of one embodiment of a router LSA 300. When the value of Type field 203 of FIG. 2 is 4, indicating a Link State Update packet, the OSPF packet will contain a number of LSAs (e.g., the packet header and LSAs). In an embodiment, the router LSA 300 may be used to facilitate packet routing during or after migration from normal packet routing by the edge routers 161-167 in FIG. 1 to packet routing using the TTZ. In an embodiment, the router LSA 300 comprises a LSA header 320, a Flags field 331, a Number of Links field 333, and a plurality of Router Links fields 341, 343, 345. In an embodiment, the LSA header 320 in the router LSA 300 comprises a link state (LS) Age field 301, an Options field 303, a LS Type field 305, a Link State ID field 307, an Advertising Router field 309, a LS Sequence Number field 311, a LS Checksum field 313, and a Length field 315. For a router LSA 300, the value of the LS Type field 305 in the LSA header 320 is 1.

The Flags field 331 in the router LSA 300 comprises a bit V, a bit E, and a bit B. The value of the Flags field 331 in a router LSA 300 indicates the characteristics of a router that originates the LSA 300. The bit V is for Virtual link endpoint. When the bit V is set to 1, the router is an endpoint of one or more fully adjacent virtual links. The bit E is External. When the bit E is set to 1, the router is an Autonomous System boundary router (ASBR). The bit B is for Border of an area. When the bit B is set to 1, the router is an area border router.

The Number of Links field 333 in the router LSA 300 is a 16-bit number, which is the number of router links that are described in the router LSA 300. The value of the number is the total number of router links to an area.

The plurality of Router Links fields 341, 343, 345 in the router LSA 300 describes every router link that a router originating the router LSA 300 has in an area. Each Router Link in the router LSA 300 describes a router link. For instance, Router Link field 341 describes a router link and Router Link field 345 describes another router link.

Figure 4:
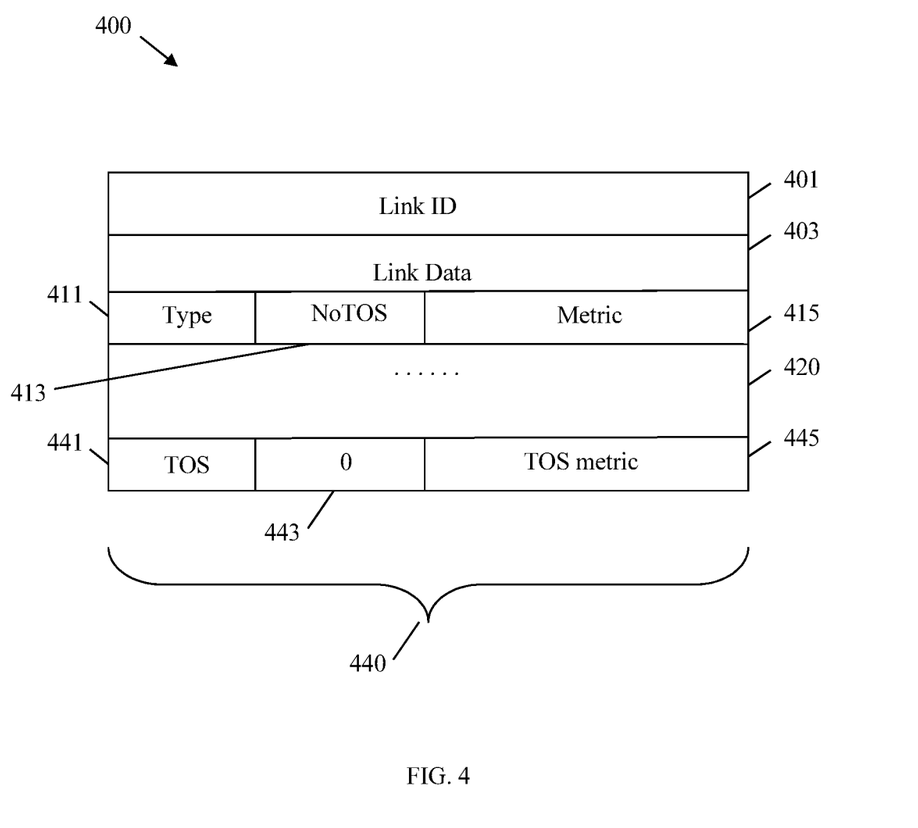
FIG. 4 is an illustration of an embodiment of a router link.

FIG. 4 is an illustration of an embodiment of a router link 400. In an embodiment, the router link 400 may be similar to the router link 345 in the router LSA 300 of FIG. 3. The router link 400 gives or describes the details of a router link such as Router Link 345 in the LSA 300 in FIG. 3. In an embodiment, the router link 400 comprises a Link ID field 401, a Link Data field 403, a Type field 411, a Number of Type of Service Metrics (NoTOS) field 413, a Metric field 415, and a plurality of Type of Service (TOS)-specific link metrics fields from 420 to 440. The value of the Type field 411 in the router link 400 indicates the kind of a link being described in the router link 400. The values of all the other fields for describing the link in the router link 400 depend on the value of the Type field.

The Type field 411 in the router link 400 may have value 1, 2, 3, or 4, which indicates that the kind of a link being described is a point-to-point connection to another router, a connection to a transit network, a connection to a stub network, or a virtual link respectively.

The Link ID field 401 in the router link 400 identifies the object that the router link 400 connects to. The value of the Link ID field 401 depends on the value of Type field 411. When the value of the Type field 411 is 1, which indicates that the kind of a link being described is a point-to-point link, the value of the Link ID field 401 is the router ID of the neighboring router. When the value of the Type field 411 is 2, which indicates that the kind of a link being described is a transit network link, the value of the Link ID field 401 is the IP address of the Designated Router. When the value of the Type field 411 is 3, which indicates that the kind of a link being described is a stub network link, the value of the Link ID field 401 is the IP number of the stub network. When the value of the Type field 411 is 4, which indicates that the kind of a link being described is a virtual link, the value of the Link ID field 401 is the router ID of the neighboring router.

In an embodiment, when a router, which is outside of a TTZ and connects to a TTZ edge router through a point-to-point link, originates a router LSA, the router LSA contains a router link describing the point-to-point link. The value of the Link ID in the router link is the router ID of the TTZ edge router. For instance, router 115 in FIG. 1 is outside of the TTZ 160 and connects to the TTZ edge router 161 through a point-to-point link between router 115 and router 161. The router LSA originated by router 115 contains a router link 400 describing the point-to-point link between router 115 and router 161. The value of the Type field 411 in the router link 400 is 1, which indicates that the kind of the link between router 115 and router 161 is a point-to-point link. The value of the Link ID field 401 in the router link 400 is the router ID 10.1.1.161 of TTZ edge router 161, which is the neighboring router of router 115.

In an embodiment, when a TTZ router, which connects to another TTZ router through a point-to-point link, originates a router LSA, the router LSA contains a router link describing the point-to-point link. The value of the Link ID in the router link is the router ID of the other TTZ router. For instance, TTZ router 171 in FIG. 1 connects to the TTZ router 161 through a point-to-point link between router 171 and router 161. The router LSA originated by the TTZ router 171 contains a router link 400 describing the point-to-point link between router 171 and router 161. The value of the Type field 411 in the router link 400 is 1, which indicates that the type of the link between router 171 and router 161 is a point-to-point link. The value of the Link ID field 401 in the router link 400 is the router ID10.1.1.161 of router 161, which is the neighboring router of router 171.

The value of the Link Data field 403 in the router link 400 depends on the value of Type field 411. When the value of the Type field 411 is 1, 2, or 4, which indicates that the kind of a link being described is a point-to-point connection to another router, a connection to a transit network or a virtual link respectively, the value of the Link Data field 403 is the IP address of the router link. When the value of the Type field 411 is 3, which indicates that the kind of a link being described is a stub network link, the value of the Link Data field 403 is the IP address mask of the stub network.

The NoTOS field 413 in the router link 400 is the number of different TOS-specific metrics given for the link being described. In one embodiment, when there is no TOS-specific metrics that are given for the link being described, the value of the NoTOS field 413 is set to 0. In this case, the router link 400 does not comprise any TOS-specific metrics from 420 to 440.

The Metric field 415 in the router link 400 indicates the cost of the link being described. In an embodiment, this metric is not a TOS-specific metric. That is, the number of TOS-specific metrics in the NoTOS field 413 does not count this metric.

In an embodiment, every TOS-specific metric from 420 to 440 has the same format, which comprises a TOS and a TOS metric. For instance, the TOS-specific metric 440 comprises a TOS field 441, a field 443 with 0, and a TOS metric 445. The value of the TOS field 441 is the IP Type of Service that the TOS-specific metric refers to. The value of the TOS field 441 may be 0, 2, 4, 8 or 16, which indicates that the IP Type of Service is normal service, minimize monetary cost, maximize reliability, maximize throughput or minimize delay respectively. The value of TOS metric is the cost of the link used for the IP Type of Service given in the TOS field 441.

Figure 5:
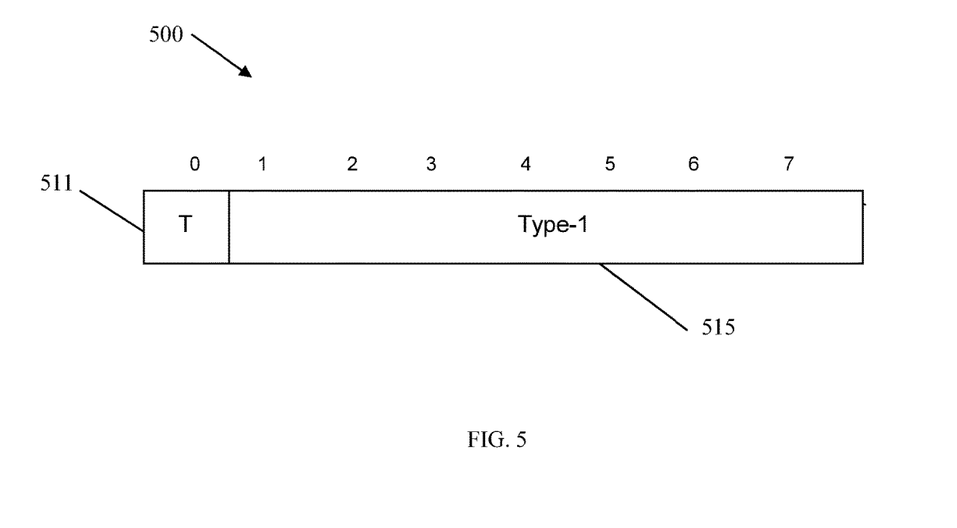
FIG. 5 is an illustration of an embodiment of a link type.

FIG. 5 is an illustration of an embodiment of a link type 500. In an embodiment, the link type 500 may be similar to the type field 411 in the router link 400 of FIG. 4. In an embodiment, the link type 500 comprises a TTZ (T) bit flag field 511 and a Type-1 field 515. The link type 500 is an extension to the link type 411 in FIG. 4. For an internal link inside a TTZ 160, the value of T bit flag field 511 may be set to 1, which indicates that this link is an internal link in the TTZ. For an external link connecting to a node outside of a TTZ from a TTZ edge node, the value of T bit flag 511 may be set to 0, which indicates that this link is an external link. The value of Type-1 field 515 may have value 1, 2, 3, or 4, which indicates that the kind of a link being described is a point-to-point connection to another router, a connection to a transit network, a connection to a stub network, or a virtual link, respectively. For an external link outside of a TTZ, the value of the link type 500 is the same as the value of the link type 411 because the value of the T bit flag field 511 in the link type 500 is 0. For an internal link inside a TTZ, the value of the link type 500 has 1-bit different from the value of the link type 411, which is the value of the T bit flag field 511 in the link type 500. In the link type 411, the bit 0 is 0; but in the link type 500, the bit 0 is 1.

For a group of routers and a number of links connecting the routers in a routing area in a network, making them to work as a TTZ 160 eventually without routing interruption to the network may take a few steps or stages.

At first, a network operator configures the TTZ feature on every router in the TTZ. In this stage, the router has dual roles. One role is to function as a normal router. The other is to generate and distribute some TTZ information among the routers in the TTZ.

There are a number of ways to configure the TTZ feature on a router in the TTZ. In an embodiment, a network operator may configure a TTZ ID on every router in the TTZ. For a TTZ internal router, the configuration of TTZ ID on the TTZ internal router indicates that every link connected to the router is a TTZ link. For a TTZ edge router, whether a link connected to TTZ edge router is a TTZ link may be identified directly by the network operator through configuration using some command line interface (CLI) commands. The TTZ link may also be inferred by the TTZ information received from other TTZ routers. In another embodiment, a network operator may configure a TTZ ID on every link in the TTZ, which indicates that the link is a TTZ link and the router supports the TTZ feature.

The TTZ information generated and distributed among the routers in the TTZ may be represented in a number of different forms. In an embodiment, every TTZ router in the TTZ generates a router LSA containing all the links connected to it. For each of the links, if the link is a TTZ link, the T bit flag field 511 in FIG. 5 for the link in the LSA is set to 1 indicating that it is a TTZ link; otherwise the T flag is set to zero. This LSA is distributed among the routers in the TTZ. The LSA will not be distributed to any router outside of the TTZ. When a TTZ router receives a LSA containing the TTZ information from another TTZ router, the TTZ router stores the LSA and floods the LSA to all the TTZ router's neighboring TTZ routers except for the one from which the LSA is received. The LSAs containing the TTZ information will not be used for computing any shortest path in this stage. The LSAs may be stored in a separate link state database.

Secondly, a network operator may allow every router in the TTZ to work as a TTZ router after he/she determines that every router in the TTZ is ready for transferring to work as a TTZ router eventually. For a router in the TTZ, the operator may allow the router to work as a TTZ router after the router has received all the necessary information from all the routers in the TTZ. This information may be displayed on a router through a CLI command.

A network operator may determine that every router in the TTZ is ready for transferring to work as a TTZ router eventually through checking the TTZ information on every TTZ router in the same TTZ.

In an embodiment, the operator may determine that a router in the TTZ is ready after this router has received and stored a router LSA from every router in the TTZ, which contains the router links indicating that the router links are the same as the links configured on the router. For each link connected to the router configured or inferred as a TTZ link, the T bit flag is set to one in the corresponding router link in the router LSA, which indicates that the link is a TTZ link. For each link connected to the router configured or inferred as a normal link (a non TTZ link), the T bit flag is set to zero in the corresponding router link in the router LSA, which indicates that the link is not a TTZ link, but a normal link.

A network operator may then activate the TTZ. There are a few ways to activate the TTZ. One way is to activate the TTZ on a TTZ router through a CLI command such as activate TTZ directly. Another is through a TTZ activate timer, which activates the TTZ once the timer expires.

After a TTZ router is requested to activate the TTZ, the TTZ router transfers to work as a TTZ router. When a TTZ router receives a LSA for virtualizing the TTZ and the TTZ router is allowed to work as a TTZ router, the TTZ router also transfers to work as a TTZ router. Thus, after every router in a TTZ is allowed to work as a TTZ router, activating the TTZ on one TTZ router will make every router in the TTZ transfer to work as a TTZ router.

For an edge router of the TTZ, transferring to work as a TTZ router comprises generating a first router LSA to virtualize the TTZ and flooding this LSA to all the TTZ router's neighboring routers, and then generating a second router LSA to virtualize the TTZ and flooding this LSA to all the TTZ router's neighboring routers after receiving a router LSA from each of the other edge routers of the TTZ to virtualize the TTZ.

The first router LSA to virtualize the TTZ generated by a TTZ edge router comprises all the link information in a normal router LSA originally generated by the edge router. That is, the first router LSA comprises a router link for each link attached to the edge router of the TTZ. The first router LSA also comprises a "virtual" router link from this edge router to each of the other edge routers of the TTZ. The type of the link is point-to-point and the cost of the link is the cost of the shortest path from this edge router to the other edge router inside the TTZ. In addition, the first router LSA comprises a set of the stub links for other destinations inside the TTZ to be leaked to the outside of the TTZ. The cost of the stub link for each of the other destinations may be the cost of the shortest path from this TTZ edge router to the destination within the TTZ. In an embodiment, the first router LSA may be generated from the normal router LSA through adding the "virtual" links and the stub links into the normal router LSA.

In a first embodiment, the second router LSA to virtualize the TTZ may be generated by a TTZ edge router after the edge router generates and floods its first router LSA to virtualize the TTZ and after the TTZ edge router receives a first router LSA to virtualize the TTZ from each of the other edge routers for a given period of time. In an embodiment, the given period of time may be the time for holding off the re-generation of an LSA. In another embodiment, the given period of time may be zero.

In a second embodiment, the second router LSA to virtualize the TTZ may be generated by a TTZ edge router after the edge router generates and floods its first router LSA to virtualize the TTZ for a given period of time such as 500 milliseconds.

In a third embodiment, the second router LSA to virtualize the TTZ may be generated by a TTZ edge router after the edge router generates and floods its first router LSA to virtualize the TTZ for a given period of time such as 500 milliseconds or after the TTZ edge router floods its first router LSA to virtualize the TTZ and receives a first router LSA to virtualize the TTZ from each of the other edge routers for a short time such as 100 milliseconds.

The second router LSA to virtualize the TTZ generated by a TTZ edge router may comprise three groups of links. The first group of links is the set of the router links connecting the routers outside of the TTZ from this TTZ edge router. These router links are normal router links. There is a router link for every adjacency between this TTZ edge router and a router outside of the TTZ. The second group of links is the set of the "virtual" router links. For each of the other TTZ edge routers, there is a "virtual" router link to it from this TTZ edge router. The type of the link is point-to-point. The cost of the router link from this TTZ edge router to one of the other TTZ edge routers may be the cost of the shortest path from this TTZ edge router to the other TTZ edge router within the TTZ. The third group of links is the set of the stub links for other destinations inside the TTZ to be leaked to the outside of the TTZ. The cost of the stub link for each of the other destinations may be the cost of the shortest path from this TTZ edge router to the destination within the TTZ. In an embodiment, the second router LSA may be generated from the first router LSA through removing the router links for the links directly connecting the TTZ edge router to the routers within the TTZ from the first router LSA.

Open Shortest Path First (OSPF) and Intermediate System To Intermediate System (IS-IS) are two Interior Gateway Protocols (IGP) protocols. The mechanisms described in this disclosure may be applied to IS-IS by one skilled in the art upon consideration of this disclosure.

Figure 6:
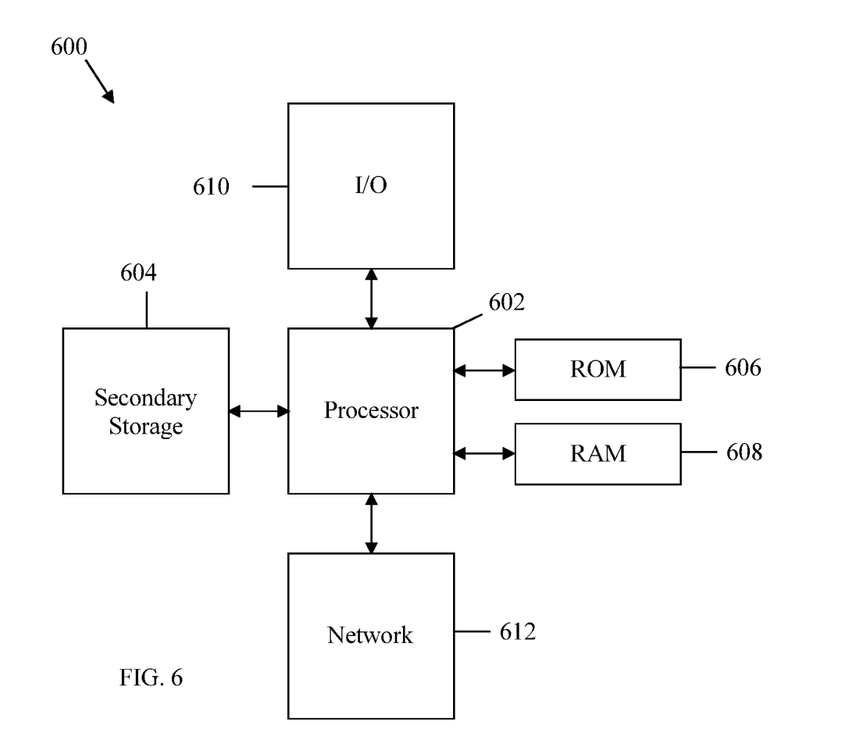
FIG. 6 is a schematic diagram of an embodiment of a network component.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips, or may be part of one or more application specific integrated circuits (ASICs). The processor 602 may be configured to execute the functionality of the methods described herein such as, for example, the method 700 of FIG. 7 and the method 800 of FIG. 8.

The secondary storage 604 is typically comprised of one or more disk drives or erasable programmable ROM (EPROM) and is used for non-volatile storage of data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604. The memory devices disclosed herein, namely secondary storage 604, ROM 606, and RAM 608 may be used alone or in combination to implement the methods described herein such as, for example, the method 700 of FIG. 7 and the method 800 of FIG. 8.

Figure 7:
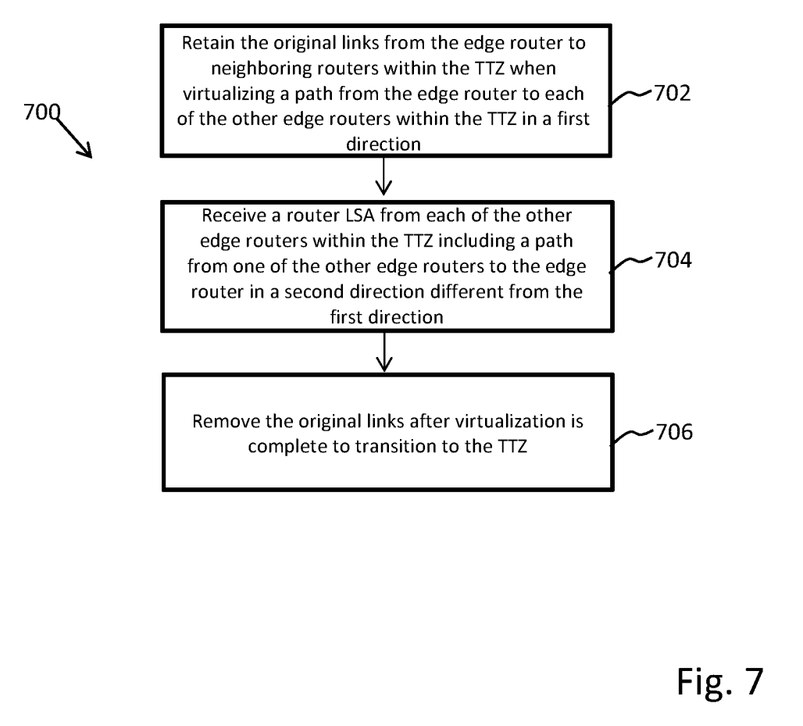
FIG. 7 is a method of avoiding routing interruption during transition to a TTZ in an embodiment.

FIG. 7 illustrates a method 700 of avoiding routing interruption during transition to TTZ in an embodiment. The method 700 may be implemented, for example, when transitioning from normal packet routing to packet routing using the TTZ. The method 700 may be implemented, for example, using an edge router in the TTZ such as edge router 161, 163, 165, or 167 in the TTZ 160 of FIG. 1. In an embodiment, the method 700 is initiated by a user controlling or operating one of the edge routers within the TTZ environment (e.g., the TTZ 160 in the OSPF area 101 of FIG. 1). In block 702, an edge router within the TTZ retains original links from the edge router (e.g., edge router 161 of FIG. 1) to its neighboring routers (e.g., neighboring routers 163, 171 and 165 of FIG. 1) within the TTZ when virtualizing a path from the edge router (e.g., edge router 161 of FIG. 1) to each of the other edge routers (e.g., other edge routers 163, 165 and 167 of FIG. 1) within the TTZ in a first direction. In block 704, the edge router within the TTZ receives a router LSA from each of the other edge routers within the TTZ comprising a path from the other edge router to the edge router in a second direction different from the first direction. In block 706, the edge router within the TTZ removes the original router links from its router LSA after virtualization is complete to transition to the TTZ.

Figure 8:
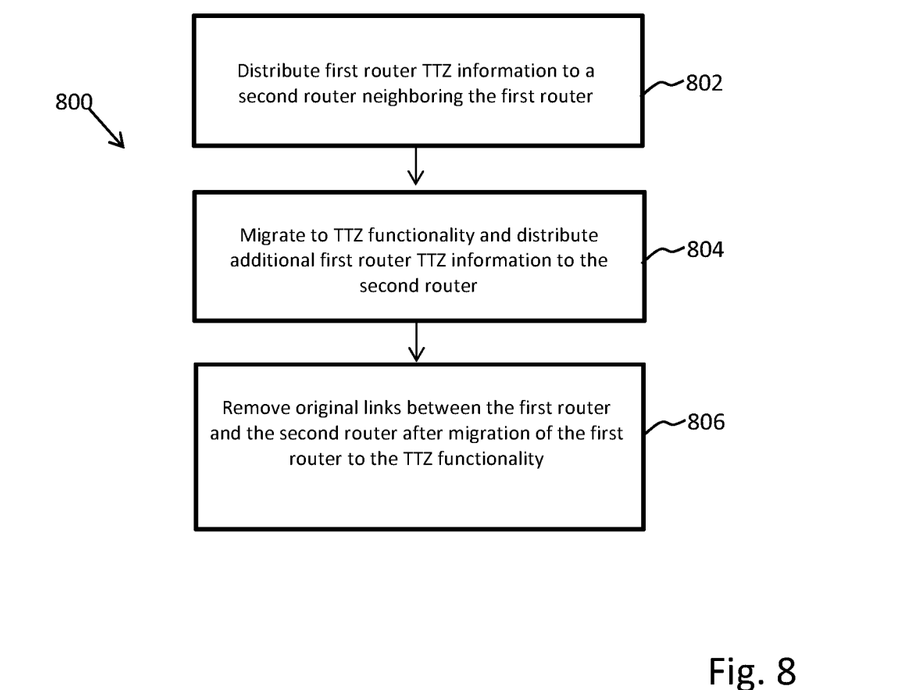
FIG. 8 is a method of smooth migration to a TTZ for routers having a TTZ feature enabled.

FIG. 8 illustrates a method 800 of smooth migration to a TTZ for routers having a TTZ feature enabled. The method 800 may be implemented, for example, when transitioning from normal packet routing to packet routing using the TTZ. The method 800 may be implemented, for example, using an edge router in the TTZ such as edge router 161, 163, 165, or 167 in the TTZ 160 of FIG. 1. In an embodiment, the method 800 is initiated by a user controlling or operating one of the edge routers within the TTZ environment (e.g., the TTZ 160 in the OSPF area 101 of FIG. 1). In block 802, the first router (e.g., router 161 of FIG. 1) distributes first router TTZ information to a second router (e.g., router 163 of FIG. 1) neighboring the first router. In an embodiment, the first router TTZ information includes a first TTZ control advertisement configured to trigger the second router to distribute neighbor router TTZ information to a third router (e.g., router 167 of FIG. 1) neighboring the second router. In block 804, the first router migrates to TTZ functionality and distributes additional first router TTZ information to the second router. In an embodiment, the additional first router TTZ information includes a second TTZ control advertisement configured to trigger the second router to migrate to the TTZ functionality and to distribute additional neighbor router TTZ information to the third router. In block 806, the first router removes original links between the first router and the second router after migration of the first router to the TTZ functionality.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method of avoiding routing interruption during transition to a topology transparent zone (TTZ) within an OSPF area (Open Shortest Path First), comprising:
    generating, by a first edge router of the TTZ, a first router link state advertisement (LSA), wherein the first router LSA comprises a first virtual link of the TTZ and an internal link of the TTZ, wherein the first virtual link is a link from the first edge router to a second edge router of the TTZ, a type of the first virtual link is point-to-point, and wherein the internal link is a link from the first edge router to a neighboring router of the TTZ;
    sending, by the first edge router, the first router LSA to a router outside of the TTZ, wherein the router outside of the TTZ connects to the first edge router;
    receiving, by the first edge router, a second router LSA from the second edge router while the internal link remains in place, wherein the second router LSA comprises a second virtual link between the second edge router and an edge router of the TTZ;
    generating, by the first edge router, a third router LSA from the first router LSA, wherein the third router LSA is generated by removing the internal link from the first router LSA including the first virtual link, wherein the internal link is removed after the second router LSA has been received from the second edge router; and
    sending, by the first edge router, the third router LSA to the router outside of the TTZ.

2. The method of claim 1, wherein the first router LSA further comprises an external link connecting the first edge router to the router outside the TTZ.

3. The method of claim 1, wherein the edge router generates and floods the third router LSA after receiving a router LSA from each other edge router of the TTZ.

4. The method of claim 3, wherein the edge router refrains from generating and flooding the third router LSA until a router LSA for virtualizing the TTZ is received from each of the other edge routers of the TTZ and a timer has expired.

5. The method of claim 1, wherein the first router LSA further comprises a stub link for other destination within the TTZ.

6. An edge router within a topology transparent zone (TTZ) within an OSPF area (Open Shortest Path First), comprising:
    an input/output (I/O) device configured to receive and transmit packets; and
    a processor operably coupled to the I/O device and configured to:
        generate a first router link state advertisement (LSA), wherein the first router LSA comprises a first virtual link of the TTZ and an internal link of the TTZ, wherein the first virtual link is a link from the first edge router to a second edge router of the TTZ, a type of the first virtual link is point-to-point, and wherein the internal link is a link from the edge router to a neighboring router of the TTZ;
        send the first router LSA to a router outside of the TTZ, wherein the router outside of the TTZ connects to the first edge router;
        receive a second LSA from the second edge router while the internal link remains in place, wherein the second router LSA comprises a second virtual link between the second edge router and an edge router of the TTZ;

generate a third router LSA from the first router LSA, wherein the third router LSA is generated by removing the internal link from the first router LSA including the first virtual link, wherein the internal link is removed after the second router LSA has been received from the second edge router; and send the third router LSA to the router outside of the TTZ.

7. The edge router of claim 6, wherein the first router LSA further comprises an external link connecting the first edge router to the router outside the TTZ.

8. The edge router of claim 6, wherein the edge router generates and floods the third router LSA after receiving a router LSA from each other edge router of the TTZ.

9. The edge router of claim 8, wherein the edge router refrains from generating and flooding the third router LSA until a router LSA for virtualizing the TTZ is received from each of the other edge routers of the TTZ and a timer has expired.

10. The edge router of claim 6, wherein the first router LSA further comprises a stub link for other destination within the TTZ.

* * * * *